United States Patent
Amla et al.

(10) Patent No.: US 10,983,531 B2
(45) Date of Patent: Apr. 20, 2021

(54) AUTONOMOUS VEHICLE TOWING SYSTEM AND METHOD

(71) Applicant: AVISHTECH, LLC, Sunnyvale, CA (US)

(72) Inventors: Tarun Amla, Chandler, AZ (US); Jyoti Amla, Chandler, AZ (US); Keshav Amla, Chandler, AZ (US)

(73) Assignee: AVISHTECH, LLC, Sunnyvale, CA (US)

( * ) Notice: Subject to any disclaimer, the term of this patent is extended or adjusted under 35 U.S.C. 154(b) by 197 days.

(21) Appl. No.: 15/955,427

(22) Filed: Apr. 17, 2018

(65) Prior Publication Data

US 2018/0239362 A1    Aug. 23, 2018

Related U.S. Application Data

(62) Division of application No. 15/052,537, filed on Feb. 24, 2016, now Pat. No. 10,007,271.

(Continued)

(51) Int. Cl.
*G05D 1/02* (2020.01)
*B60W 30/00* (2006.01)
(Continued)

(52) U.S. Cl.
CPC ............ *G05D 1/0295* (2013.01); *B60W 30/00* (2013.01); *G05D 1/0011* (2013.01); *G08G 1/22* (2013.01); *G05D 2201/0213* (2013.01)

(58) Field of Classification Search
CPC ............... G05D 1/0295; G05D 1/0011; G05D 2201/0213; G05D 1/028; B60W 30/00; B60W 30/165; G08G 1/22
See application file for complete search history.

(56) References Cited

U.S. PATENT DOCUMENTS

| | | | |
|---|---|---|---|
| 5,295,551 A | 3/1994 | Sukonick | |
| 5,572,449 A | 11/1996 | Tang et al. | |

(Continued)

FOREIGN PATENT DOCUMENTS

| | | |
|---|---|---|
| CN | 101859494 A | 10/2010 |
| CN | 102906654 A | 1/2013 |

(Continued)

OTHER PUBLICATIONS

Extended European Search Report received for EP Patent Application Serial No. 16873951.4 dated Jun. 12, 2019, 10 pages.

(Continued)

*Primary Examiner* — Nga X Nguyen
(74) *Attorney, Agent, or Firm* — Amin, Turocy & Watson, LLP

(57) ABSTRACT

Systems and methods disclosed relate to autonomous vehicle technology. A follow vehicle having driving controls for use by humans may be equipped with a wireless transceiver, controller, sensors, and interfaces for use with control systems such that the follow vehicle may be caused to follow the lead vehicle without human interaction with the follow vehicle. The follow vehicle may wirelessly receive information from the lead vehicle regarding position, movement, acceleration or deceleration, steering, or other information relevant to following the lead vehicle. The follow vehicle may include sensors for sensing the position, movement, acceleration, deceleration, steering, or other properties of the lead vehicle. The lead vehicle may be equipped with RF transmitters that provide indicators to the follow vehicle, such that the sensors can more readily sense the lead vehicle. Multiple follow vehicles may be wirelessly linked to form a train that is not mechanically linked.

16 Claims, 11 Drawing Sheets

Related U.S. Application Data

(60) Provisional application No. 62/266,550, filed on Dec. 11, 2015.

(51) Int. Cl.
*G05D 1/00* (2006.01)
*G08G 1/00* (2006.01)

(56) References Cited

U.S. PATENT DOCUMENTS

| | | | |
|---|---|---|---|
| 5,777,451 A | 7/1998 | Kobayashi et al. | |
| 2007/0260386 A1 | 11/2007 | Tandy et al. | |
| 2007/0290822 A1 | 12/2007 | Gerber | |
| 2010/0256852 A1* | 10/2010 | Mudalige | G08G 1/22 701/24 |
| 2012/0123660 A1 | 5/2012 | Kagawa et al. | |
| 2017/0147005 A1* | 5/2017 | Ramm | G05D 1/0295 |
| 2017/0168504 A1 | 6/2017 | Darms et al. | |

FOREIGN PATENT DOCUMENTS

| | | |
|---|---|---|
| CN | 103253261 A | 8/2013 |
| CN | 103287285 A | 9/2013 |
| CN | 103935366 A | 7/2014 |
| CN | 104002817 A | 8/2014 |
| CN | 104503265 A | 4/2015 |
| CN | 104742906 A | 7/2015 |
| CN | 204595513 A | 8/2015 |
| CN | 104950890 A | 9/2015 |
| EP | 1 569 183 A2 | 8/2005 |

OTHER PUBLICATIONS

Communication pursuant to Rules 70(2) and 70a(2) EPC received for EP Patent Application Serial No. 16873951.4 dated Jun. 28, 2019, 1 page.
Brazilian Office Action for Brazilian Application No. BR112018011785-4 dated May 28, 2020, 7 pages.
International Search Report and Written Opinion for PCT Application Serial No. PCT/US16/65900, dated Mar. 10, 2017, 13 pages.
Final Office Action for U.S. Appl. No. 15/052,537, dated Feb. 16, 2017, 28 pages.
Office Action for U.S. Appl. No. 15/052,537, dated Nov. 1, 2016, 31 pages.
Office Action for U.S. Appl. No. 15/052,537, dated Jun. 10, 2016, 20 pages.
Non-Final Office Action for U.S. Appl. No. 15/052,537, dated Jul. 13, 2017, 35 pages.
Final Office Action for U.S. Appl. No. 15/052,537, dated Dec. 6, 2017, 45 pages.
Communication pursuant to Rules 70(2) and 70a(2) EPC received for EP Patent Application Serial No. 16873951.4 dated Oct. 5, 2020, 4 page.
Office Action received for JP Application Serial No. 2018-549404, dated Dec. 1, 2020, 8 pages.
China office action received for Chinese patent application No. 201680078547.0 dated Dec. 7, 2020, 16 pages.

* cited by examiner

AUTONOMOUS VEHICLE TOWING SYSTEM AND METHOD

CROSS-REFERENCE TO RELATED APPLICATION

This application is a Divisional of U.S. non-provisional application Ser. No. 15/052,537, filed Feb. 24, 2016, which claims priority to U.S. provisional application Ser. No. 62/266,550, filed Dec. 11, 2015, the entirety of which is incorporated herein by reference.

BACKGROUND

Self-driving automobiles have become ubiquitous in the past few years, as they have been developed by multiple companies, advertised, and promoted extensively in the news media. Prominent companies such as Google have tested self-driving independent vehicles extensively on public roads. Other companies such as Tesla have provided autopilot-type features in certain vehicles that are available for purchase by the public. Additional companies such as Apple have announced plans to develop self-driving cars. According to some estimates, millions of self-driving cars will be on the road by 2020.

In general, self-driving cars are divided into two different types. Those are autonomous cars that can drive wholly without assistance and semi-autonomous cars that need some human assistance. Fully autonomous cars can be further divided into user-operated vehicles and driverless vehicles.

Most self-driving cars are specialty vehicles that have many integrated sensors and controllers for monitoring various aspects of the road and driving conditions surrounding the vehicle. Such vehicles are generally very expensive or not available for public purchase at present.

Moreover, even where such vehicles are available for purchase, they are often specialized vehicles that may not have features desirable to different types of users. For example, a family wishing to take two vehicles on a long trip may not wish to take the small type of vehicle that Google is developing and may, for that reason, forego the purchase of a self-driving vehicle because the family wishes to have two minivans available while on the trip. However, the inventors are not aware of any minivans that are currently available as self-driving cars. For this reason, a family taking two minivans on vacation may be forced to employ two drivers, one for each minivan. In the alternative, the family may cram itself into a single minivan so that drivers may share driving responsibility. Or, the family may retrofit one minivan with towing equipment and rent or purchase a trailer to tow the second minivan. Or, the family may elect to skip the vacation rather than employing one of the listed options. In some instances, the family may wish to take the vacation with two vehicles, neither of which is capable of towing the other, making it impossible to share driving responsibilities.

Similarly, an owner of a recreational vehicle (RV) may want to bring a second vehicle on a trip so that the RV may remain parked at the destination and the second, smaller vehicle may be used to travel to restaurants, stores, museums, and other destinations that the RV owner wishes to visit that do not accommodate RV parking. Some RVs may be equipped for towing a second vehicle, but some may not. Additionally, some RV owners are not capable of driving an RV towing another vehicle or do not feel safe doing so.

Additionally, current methods of towing a vehicle with another vehicle are very involved processes. The towing apparatus and process involves physical links, such as chains, rigid rods, braking systems between the towing and the towed vehicle and modifications to one or both vehicles. Other methods involve use of a trailer which can carry the towed vehicle in full or in part. In direct towing methods, modifications are often required for the towed and the towing vehicle. The additional load of a towed vehicle adds wear and tear to both the towed and the towing vehicle. The cost of modifications is not insignificant. And the process of engaging and disengaging the tow mechanism is cumbersome and time consuming. This is regularly seen when a vehicle such as a recreational vehicle (RV) must to tow another vehicle. Moreover, in the above case there are a limited number of types of vehicles that can be easily retrofitted for the purpose of towing.

For these reasons, it would be desirable to have a way to "tow" a follow vehicle behind a lead vehicle without a physical attachment between the lead and follow vehicles and without a driver in the follow vehicle. It would also be desirable to have a way to "tow" a follow vehicle under its own power, either because the lead vehicle does not have sufficient power to pull the follow vehicle or because travel may be safer or faster if the lead and follow vehicles are not mechanically linked.

In many instances, drivers engaged in long, cross-country drives may be overtired or overstressed from long distance driving and wish to have an opportunity to rest, rather than driving for the remainder of a journey. Such drivers could rest if they were not required to constantly monitor the road and adjust the controls of their vehicles. But, currently, no systems or methods allow for such rest.

Similarly, in many urban areas, drivers are confronted with tedious commutes in standstill or stop-and-go traffic. Such commutes cause stress and accidents when drivers lose attention or attempt risky maneuvers. Additionally, the delayed response when drivers must accelerate or decelerate in busy traffic propagates to a large degree and causes traffic jams and slow traffic.

For these reasons, it would be desirable to have systems and methods that allow for drivers to place their vehicles into a "train" or "convoy" of vehicles that is not connected physically, but wirelessly. It would be desirable to allow all of the vehicles behind a lead vehicle to follow the lead vehicle while allowing the drivers of the following vehicles to rest and/or lower their stress levels. It would also be desirable to have a system that would reduce the delayed responses that propagate to multiple cars in busy traffic, by providing a system that communicates acceleration and deceleration information such that multiple vehicles can simultaneously or nearly-simultaneously accelerate or decelerate.

It would also be desirable to have an autonomous vehicle piloting and control system that can be used in a standard vehicle with human-operable controls by placing the piloting and control system in the vehicle when needed and, if desired, removing it or moving it to another vehicle when not needed. It would be desirable to fashion such a system in a manner that it can communicate wirelessly with a human-operated vehicle and follow a human-operated vehicle so that extensive and expensive sensor systems and artificial intelligence are not required. Instead, it is desirable to provide systems and methods that use more limited sensor and control systems to reduce the cost of converting a vehicle into a self-driving vehicle that follows another vehicle.

For the avoidance of doubt, the above-described contextual background shall not be considered limiting on any of the below-described embodiments, as described in more detail below.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

Accordingly, embodiments of the present invention may provide systems, structures, and methods of providing a way to "tow" one or more follow vehicles behind a human-operated lead vehicle without any physical connection.

Embodiments of the invention may provide controllers connected to wireless transceivers, sensors, and devices for controlling the steering and powertrain of a vehicle to provide a way to receive information and translate that information into control signals to cause a vehicle to follow another vehicle.

Embodiments of the invention may provide a systems and methods for a human-piloted lead vehicle to lead a train or convoy of multiple unpiloted vehicles that are connected wirelessly to the lead vehicle to provide the ability to reduce the number of human drivers needed in vehicles having standard, human-operable controls.

Various embodiments of the present invention may provide sensors and transmitters for use in the automated control of an unpiloted follow vehicle following a lead vehicle piloted by a human.

In various embodiments of the invention, directional wireless communication transmissions may be used to reduce the possibility of signals being intercepted or interfering with others. In other embodiments of the invention, a wireless signal may be more broadly broadcast so that one or more vehicles may receive the signal without line-of-sight to the transmitter.

Embodiments of the present invention may also provide a new, wireless, autonomous driving technology that does not require the use of rigid links and chains when causing an unpiloted vehicle to follow a piloted vehicle.

Various embodiments of the present invention may incorporate one or more of these and the other features described herein. A better understanding of the nature and advantages of the present invention may be gained by reference to the following detailed description and the accompanying drawings.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION OF ILLUSTRATIVE EMBODIMENTS

Figure 1:
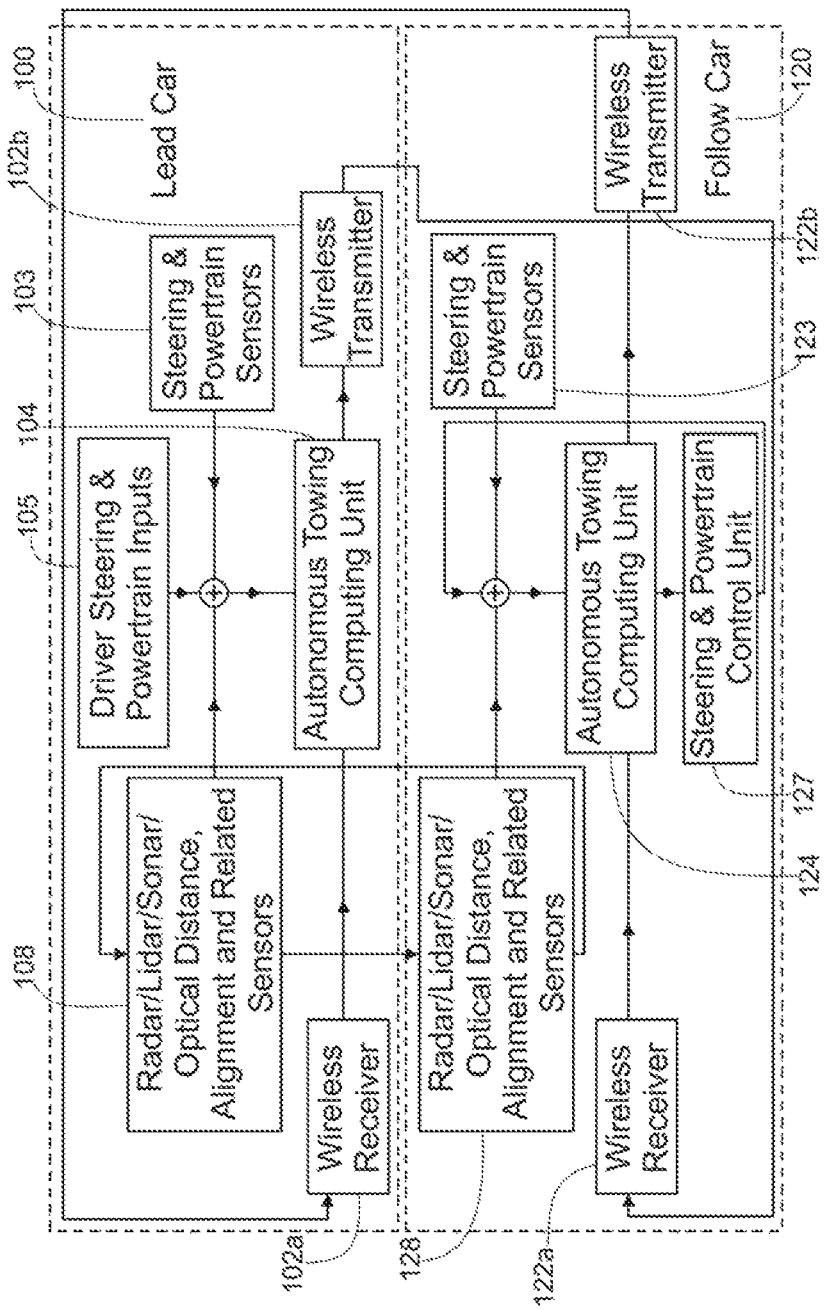
FIG. 1 illustrates a block diagram of major system components according to an embodiment of the present invention.

The various embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details. In other instances, well-known structures and devices are shown in block diagram form in order to facilitate describing the various embodiments.

FIG. 1 illustrates a block diagram of many components of the invention that may be used in implementing the systems and methods disclosed herein. This FIG., as with the other included FIGS., is shown for illustrative purposes and does not limit either the possible embodiments of the present invention or the claims.

In some embodiments, the inventive system and method may be implemented in connection with a lead vehicle (or lead car) 100 and a follow vehicle (or follow car) 120. Lead vehicle 100 may incorporate components including a computing unit (or electronic controller) 104, a wireless receiver 102a, a wireless transmitter 102b, steering and powertrain sensors 103, driver steering and powertrain inputs 105, and sensors 108. Follow vehicle 120 may include a computing unit (or electronic controller) 124, a wireless receiver 122a, a wireless transmitter 122b, steering and powertrain sensors 123, a steering and powertrain control unit (or momentum control system) 127, and sensors 128.

The various components may be similar or different for a lead vehicle and a follow vehicle. For example, in a lead vehicle it may be more advantageous to have certain rear-facing sensors for determining the position or other attributes of the follow vehicle, while in a follow vehicle it may be more advantageous to have certain forward-facing sensors for determining the position or other attributes of the lead vehicle. Computing units 104 and 124 may comprise one or more processors, memory, input and output capabilities, battery or other power sources, and requisite electronics and circuitry for the purposes to be accomplished. Steering and powertrain sensors 103 and 123 may include sensors that sense steering inputs, lateral movement, speed, acceleration, deceleration, throttle position, brake position, gear engagement, engine temperature, fuel level, wheel alignment, steering wheel position, and/or numerous other types of information and generate lateral motion data and forward motion data among other types of data. Sensors 103 and 123 may be implemented by attaching physical sensors to the lead vehicle 100 or follow vehicle 120 or by interfacing electronically or mechanically with sensors that are already present in vehicle 100 and/or 120. The steering and powertrain control unit 127 in the follow car 120 may be a physical interface with human operable controls that is configured to physically manipulate the steering wheel, pedals, gear shift lever, etc. Or, control unit 127 may be an interface to pre-existing controls that may be controlled through an existing computer or control system with the vehicle.

Wireless transmitter 122b and receiver 122a may be separate or integrated into a single unit, and may be the same as or different from wireless transmitter 102b and receiver 102a. The wireless transmitters may be RF transmitters that transmit according to cellular transmission standards, 802.11 standards, citizen's band, audio, optical, or other known transmission methods. In some embodiments the transmitters and receivers may be line-of-sight devices, including laser devices. In other embodiments, it may be desirable to enable longer distance wireless communications. One of ordinary skill in the art will be able to pick or design a wireless transmitter and receiver that have sufficient range, reliability, and transmission rates for the methods and systems set forth herein.

Driver steering and powertrain inputs are provided by a human operator in the case of a lead vehicle 100. In the case of a convoy embodiment where multiple vehicles are following a lead vehicle 100, each of the follow vehicles may receive driver steering and powertrain inputs from a steering and powertrain control unit. The driver steering and powertrain inputs may be sensed by the steering and powertrain sensors 103 or 123. Or the inputs may be sensed by dedicated sensors and relayed to the autonomous towing computing unit 104 or 124.

Each of the vehicles 100, 120 may be equipped with various sensors 108 or 128. Those sensors may include many types of sensors related to positioning, movement, computer vision, etc. that may be useful in providing systems and methods by which one vehicle may follow another without human operation of the follow vehicle. For example, sensors 108 or 128 may include radar, lidar, sonar, optical distance, alignment, laser, GPS, Doppler, infrared, ultraviolet, audio, various RF, acceleration, deceleration, engine heat, gyroscopic, magnetic, microphone, and other sensors both discussed herein and not discussed herein but known in the art.

In vehicle 100, sensors 108, inputs 105, and sensors 103 may provide various inputs into computing unit (or electronic controller) 104, along with received information from receiver 102a. Computing unit 104 may process some or all of the received information and determine which information and commands to send to vehicle 120 or another vehicle via wireless transmitter 102b. Wireless transmitter 102b then transmits a transmission intended for receipt by at least wireless receiver 122a. Depending on the types of sensors 108 or transmitters included in vehicle 100, sensors 108 or transmitters may provide additional data to sensors 128 through direct transmission.

In vehicle 120, information sensed by sensors 128, inputs from sensors 123, feedback from control unit 127 and guidance transmissions including information and commands received by wireless receiver 122a may be transmitted to computing unit 124. Computing unit (or electronic controller) 124 may process some or all of the received information and determine which commands to output to control unit 127 in the form of control data to control the vehicle 120. Computing unit 124 may also determine which commands or information to send to vehicle 100 or another vehicle via wireless transmitter 122b. Wireless transmitter 122b then transmits a transmission intended for receipt by at least wireless receiver 102a.

Figure 2:
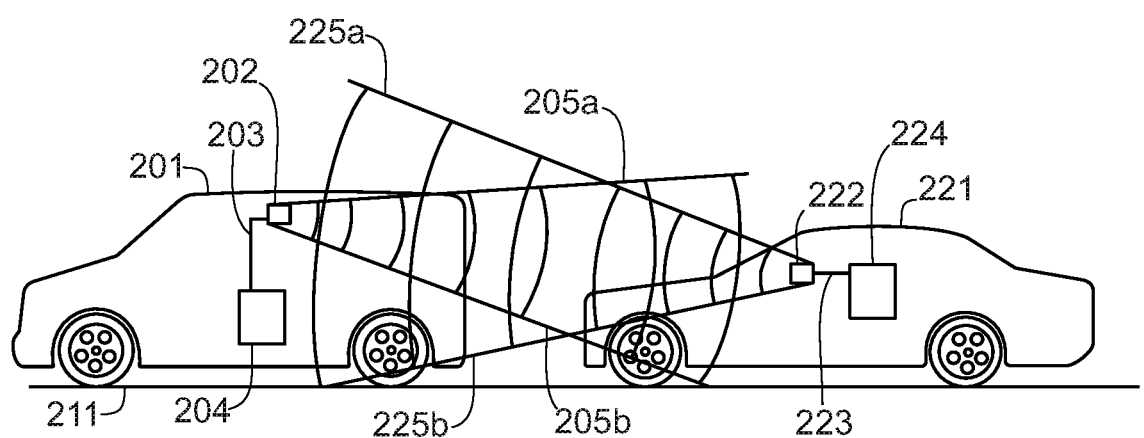
FIG. 2 illustrates a side view of a block diagram of two vehicles according to an embodiment of the present invention.

Referring now to FIG. 2, a block diagram of an embodiment of portions of the invention is shown. Lead vehicle 201 (corresponding to the above-noted lead vehicle 100) and follow vehicle 221 (corresponding to the above-noted follow vehicle 120) are illustrated as being arranged in sequence on surface 211, preferably a roadway or other travel surface. Lead vehicle 201 is illustrated as being a large vehicle such as a recreational vehicle (RV). And follow vehicle 221 is illustrated as being a smaller vehicle such as a sedan, convertible, van, truck, station wagon, hatchback, or other passenger vehicle. However, in some embodiments of the invention, the lead vehicle may be a smaller vehicle such as a passenger vehicle and the follow vehicle may be a larger vehicle such as an RV, semi tractor-trailer, or other vehicle, because in the invention, the lead vehicle need have only sufficient power to propel itself, rather than requiring sufficient power to propel itself as well as a follow vehicle. The follow vehicle is self-powered. In some instances, for example, where a human driver does not have the appropriate license for operation of a large vehicle, it will be desirable to allow the human driver to operate a vehicle for which an appropriate license is held, while the vehicle for which the human is unlicensed follows using the invention described herein.

In such circumstances, it may be desirable to program or otherwise maintain appropriate safety and operational data within the control unit 224 (corresponding to computing unit 124) of the follow vehicle and/or the control unit 204 (corresponding to computing unit 104) of the lead vehicle. For example, if follow vehicle 221 requires a braking distance of 175 feet at a particular speed, it may be desirable to restrict the braking distance of lead vehicle 201 such that lead vehicle 201 may not stop in less than that braking distance when travelling at the same speed, to prevent follow vehicle 221 from colliding with the rear of lead vehicle 201. Likewise, to permit follow vehicle 221 to maintain an appropriate following distance, it may be desirable to limit the acceleration characteristics of lead vehicle 201 in the same manner. For example, if follow vehicle requires 15 seconds to accelerate from 0 to 60 mph and lead vehicle 201 requires 10 seconds to accelerate from 0 to 60 mph, it may be desirable to cause controller 204 to limit the acceleration of lead vehicle 201 to an appropriate acceleration profile such that lead vehicle 201 does not accelerate too quickly and outpace follow vehicle 221.

In situations described herein, wherein multiple vehicles are using the invention to travel in a convoyed or train-like manner, it may be desirable that the control units in each vehicle communicate with a centralized control unit or with each of the other control units in a coordinated fashion to determine maximum and minimum acceptable travel characteristics for all of the vehicles in the convoy. For example, acceleration and deceleration rates, top speeds, turn radii, cornering profiles, vehicle height, vehicle weight, and other operational characteristics may restrict the manner in which the vehicles travel and the roadways or non-roadways on which the vehicles may travel in concert. Coordination of such travel characteristics may allow for better operation of a convoy in which multiple vehicles are travelling. In certain situations, such as the situations depicted in FIG. 6A, depending on the range of the wireless communication links between the vehicles and whether the links require line-of-sight communications, it may not be possible for the last vehicle in the convoy 671 to communicate directly with lead vehicle 201. However, it may be necessary for the control unit 204 in lead vehicle 201 to know the travel characteristics of last vehicle 671. In such circumstances, it may be necessary to transmit the data from last vehicle 671 to vehicle 661, then to vehicle 651, then to vehicle 641, then to vehicle 631, then to vehicle 221, and finally to vehicle 201, at which point it may be necessary to reverse the path and hops of data to transmit an acknowledgement to vehicle 671. In other circumstances, fewer links may be required, such as a link from vehicle 671 to vehicle 641, then to vehicle 201, to transmit the data and acknowledgement. Or a wireless mesh network that seeks to optimize or enhance transmission speeds, distances, or capabilities between its nodes may be formed.

Returning now to FIG. 2, controller 204, preferably a computational unit capable of processing data received from multiple sensors and transceiver 202 (corresponding to receiver 102a and transmitter 102b), as well as generating appropriate data for transmission and any required control operations is illustrated as a block in lead vehicle 201. Controller 204 comprises at least one processor, memory, and appropriate circuitry or peripherals for functioning as described herein. Controller 204 must have appropriate processing speed, memory, and other functionality to operate in real-time travel conditions. Connection 203 is indicated as connecting wireless transceiver 202 to controller 201. Connection 203 may be a wired, mechanical, optical, wireless, or other appropriate connection for relaying data between transceiver 202 and controller 204 in real-time travel conditions. Wireless transceiver 202 is illustrated as a directional transmitter, transmitting a signal compliant with an IEEE 802.11 standard to the rear of vehicle 201. However, in certain embodiments, transceiver 202 may be an optical, infrared, ultraviolet, or laser transceiver, or may be multi- or omni-directional, and may transmit and receive information according to other known transmission protocols suitable for two-way communication of data. Transceiver 202 may be configured to connect with a single transceiver, such as transceiver 222, or with multiple additional transceivers, such as may be required in the operations illustrated in FIGS. 5 and 6A. As illustrated, the transmission of transceiver 202 is depicted as a slice of a cone that is bounded by limits 205a and 205b.

Controller 224 is illustrated as a block in follow vehicle 221. Controller 224 may be constructed similarly to controller 204, or may have additional or fewer features than controller 204. For example, it is anticipated that in most or all instances, a human driver will operate lead vehicle 201, while follow vehicle 221 will have human operable controls, but will be operated by controller 224 and appropriate interfaces (discussed herein) with the controls of vehicle 221. Thus, the capabilities of controllers 204 and 224 may be varied depending on their use. It is anticipated that in certain circumstances, such as warzones or other dangerous areas, it may be desirable that lead vehicle 201 be an unmanned minesweeper, improvised explosive device (IED) detector/detonator, or decoy vehicle while follow vehicle 221 or a later vehicle in a convoy be the first vehicle with a human occupant. Thus, in some embodiments of the invention, the control capabilities described as being associated with lead vehicle 201 may actually be embodied in a later vehicle in the convoy and the capabilities described with respect to follow vehicle 221 may be embodied in lead vehicle 201. In such embodiments it may be necessary to provide additional control capabilities for vehicle 201 in vehicle 221 to cause vehicle 201 to take the path desired by the human controller of vehicle 221. For example, a remote wireless control may be necessary to cause vehicle 201 to make a sharp turn or leave a particular path of travel prior to an adjustment by vehicle 221. For example, vehicle 201 may be directed to make a sharp right turn on an intersecting road prior to the arrival of vehicle 221 at that intersection or any indication that vehicle 221 will turn at that intersection.

Controller 224 is connected to wireless transceiver 222 (corresponding to receiver 122a and transmitter 122b) using connection 223. Connection 223 may be of the same type as connection 203 or of a different type. For example, connection 223 may be a fiber optic connection while connection 203 is a wireless connection. In preferred embodiments of the invention, wireless transceiver 222 has similar or identical characteristics to wireless transceiver 202, as the invention requires wireless communication between transceiver 202 and transceiver 222. As illustrated, transceiver 222 is depicted as a directional transceiver transmitting to the front of vehicle 221. The transmission of transceiver 202 is depicted as a slice of a cone that is bounded by limits 225a and 225b. As illustrated, transceiver 202 falls within the cone bounded by limits 225a and 225b, and transceiver 222 falls within the cone bounded by limits 205a and 205b. It can be seen that, if directional transceivers are employed, the spread of such cones should be sufficient to properly communicate when vehicles 201 and 221 are in close proximity or spaced more distantly, especially where, as depicted here, the height or lateral placement of one transceiver 202 is different than the height or lateral placement of the other transceiver 222. Similarly, because vehicles turn while travelling, vehicle 201 may not always be directly in front of vehicle 221. Thus, the cone should be broad enough to account for turns during travel. In some circumstances, where a highly directional wireless transceiver, such as a laser or other narrow beam is used, it may be necessary to provide actuators to alter the direction of transmission during travel to maintain communications. It is envisioned that such devices may be used where security is important, such as in warzones, or where governmental or other restrictions require the use of such devices or prohibit other wireless transmissions.

Figure 3:
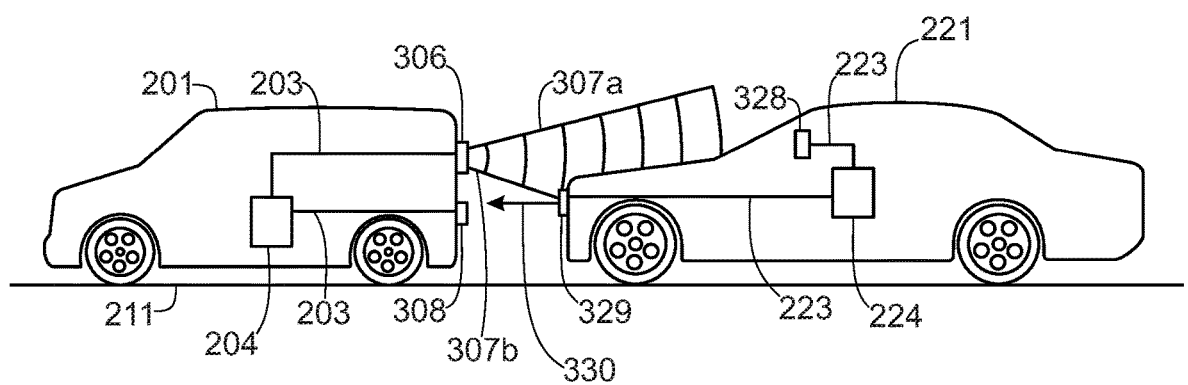
FIG. 3 illustrates a side view of a block diagram of two vehicles according to an embodiment of the present invention.

Referring now to FIG. 3, a partial block diagram of a pair of vehicles implementing an embodiment of the invention is depicted. Lead vehicle 201 and follow vehicle 221 are depicted on surface 211. Lead vehicle 201 is depicted in front of follow vehicle 221. Lead vehicle 201 may be equipped with controller 204, which is connected via connections 203 to one or more of transmitter 306 and sensor 308. Follow vehicle 221 may be equipped with controller 224. Controller 224 may be connected to sensor 328 and/or transmitter 329 using connections 223. Connections 223 and 203 may have the same characteristics described in connection with FIG. 2.

Sensors 308 and 328 are each configured to sense an input and provide information that is relevant to the ability of the follow vehicle 221 to follow lead vehicle 201. In certain embodiments, where multiple vehicles form a train or convoy, sensors 308 and 328 may also sense information relevant to other vehicles leading or following. Sensor 308, for example, may sense the distance to vehicle 221, the speed of vehicle 221, the direction of travel of vehicle 221, the acceleration or deceleration of vehicle 221, the attitude of vehicle 221, the position of visible or invisible road markings (e.g., buried magnets or other markings), the position of devices embedded in a roadway for vehicle guidance, the position of other vehicles on the roadway, the position of other stationary or mobile objects that are encountered, or other information that may be useful to assist vehicle 221 with following vehicle 201 and to assist vehicle 201 with leading vehicle 221. For example, on a significant uphill incline, sensor 308 might sense that the distance to vehicle 201 is increasing. If this information is considered in connection with information transmitted by vehicle 221 indicating that vehicle 221 is at full throttle, the combined information may be used to inform the operator (human or computer) of vehicle 201 that speed should be reduced to avoid wireless, visual, or other decoupling from follow vehicle 221. In another example, on a significant downhill incline, sensor 308 may receive an indication that the distance to follow vehicle 201 is decreasing. If this information is considered in connection with information transmitted by follow vehicle 201 indicating that follow vehicle 201 is using a combination of maximum safe braking and/or maximum safe engine braking, the combined information may be used to inform the operator (human or computer) of vehicle 201 that speed should be increased to avoid a rear-end collision or unsafe follow distance by follow vehicle 221. Sensor 308 may be implemented with multiple sensors (not illustrated in FIG. 3), of which one or more are connected to controller 204.

Similarly, sensor 328 may sense the same or different types of input sensed by sensor 308, as may be required to implement safe travel while following lead vehicle 201. As with sensor 308, sensor 328 may be implemented with multiple sensors (not illustrated in FIG. 3), of which one or more are connected to controller 224. Portions of sensors 308 and 328 that are not connected to their relevant controller may be connected to another intermediate sensor tasked with relaying some or all of the collected information (or an analysis of the information) to the relevant controller. In some embodiments of the invention, sensors 308 may be wirelessly linked to controller 224 rather than connected to controller 204. Similarly, in some embodiments, sensor 328 may be wirelessly linked to controller 204, rather than connected to controller 224. Wirelessly linking sensors in this manner may permit faster routing of information to the most relevant controller and/or ease the process of installing or mounting sensors on a lead or follow vehicle.

In one embodiment, sensor 328 may sense the position of road markings in relation to the position of lead vehicle 201 and/or follow vehicle 221. Sensor 328 may use the information provided by this input to correctly position vehicle 221 to follow vehicle 201. If sensor 328 senses that the left-most portion of vehicle 201 is consistently approximately one foot to the right of a lane marking, that information might be used to position the left-most portion of follow vehicle 221 in a similar spatial arrangement, rather than to, for example, position the center of vehicle 221 behind the center of vehicle 201, especially where vehicle 201 is narrower than vehicle 221 and centering vehicle 221 on vehicle 201 would result in vehicle 221 failing to maintain a position within lane markings or with respect to nearby obstacles. In another example, sensor 328 may sense a rapid deceleration by vehicle 201 such that vehicle 221 may begin appropriate deceleration or evasive maneuvers even if vehicle 221 has not received a wireless transmission from lead vehicle 201 indicating that such maneuvers should be taken.

In certain embodiments, transmitters 306 and 329 may also be incorporated to assist with the process of leading and following. As with the sensors, each of the block diagram illustrations of transmitters 306 and 329 may be implemented with one or more transmitters. Transmitter 329 is depicted as transmitting a linear, non-spreading RF signal 330, such as a laser beam focused on a single point. Transmitter 306 is depicted as transmitting a conical, spreading RF signal depicted as a slice of a cone having upper bound 307a and lower bound 307b, such as infrared radiation that may be viewed from many positions. Ideally, a transmitter, such as transmitters 306 and 329 will emit and/or transmit signals that are not visible, audible, or otherwise detectable by humans, to limit the impact of such emissions and transmissions on humans sharing a roadway with or otherwise encountering lead vehicle 201 and follow vehicle 221, either as drivers or observers. For example, transmitter 306 may produce a beacon, symbol or otherwise recognizable transmission in ultraviolet or infrared RF emissions. A transmission of this type will not be detectable by humans, but may be detectable by the appropriate sensor 328 (assuming that sensor 328 is not mounted behind a material that is opaque to the transmissions). In this instance, sensor 328 may be equipped with or connected to a processor with pattern recognition capabilities such that the pattern transmitted by sensor 306 may be easily used to distinguish lead vehicle 201 from other vehicles. For example, it may be possible that while vehicles 201 and 221 are travelling on a high speed freeway with an extended following distance (as will be described below in connection with FIG. 4B), a third vehicle may intervene between vehicles 201 and 221 causing confusion as to which vehicle is being led by vehicle 201 and which vehicle is being followed by vehicle 221. If the intervening vehicle then switches lanes or exits the freeway, it may be possible that vehicle 221 would begin following the intervening vehicle based on visual recognition of that vehicle or that vehicle 201 would sense the divergent path of the intervening vehicle as an emergency condition affecting follow vehicle 221 and take actions normally reserved for an emergency. In such situations disastrous results may ensue. However, if vehicle 201 is equipped with a transmitter 306 transmitting a recognizable pattern (e.g., a spatial or temporal transmission pattern), the controller 224 in vehicle 221 may be configured to determine that the intervening vehicle is not lead vehicle 201 based on the loss of detection of transmitter 306's signal by sensor 328, and thereby take appropriate action, including possibly wirelessly transmitting to vehicle 201 that an intervening vehicle was sensed and/or requesting wireless instructions from vehicle 201.

In certain embodiments, it may be desirable to implement either or both of transmitters 306 and 329 in a manner that is less easily detectable by persons or sensors other than a target sensor. For example, transmissions of a spreading signal, such as that depicted as bounded by boundaries 307a and 307b, may be detected not only by sensor 328, but by sensors on other vehicles, sensors mounted at a fixed location, humans wearing infrared (or other appropriate) goggles, etc. This spread transmission might interfere with the operation of the other sensors or may unnecessarily allow others to determine the location of the vehicle or vehicles transmitting such signals. In situations where this may be undesirable, it may be more desirable to implement the invention using non-spreading transmission, such as a focused laser beam. Transmitter 329 provides an example of such a transmission, as it is depicted transmitting a non-spreading transmission 330. This transmission may provide one or numerous types of information to sensor 308 in lead vehicle 201. For example, transmission 330 may merely be used by sensor 308 to determine the relative position or attitude of vehicle 221 with respect to sensor 308 as the point at which the beam impacts sensor 308 moves to various points on sensor 308. In other embodiments, the transmission may carry additional information or provide additional information. For example, if transmission 330 has a known wavelength, sensor 308 may be equipped to determine Doppler shift in transmission 308 to determine whether vehicle 221 is travelling at the same speed as vehicle 201. Or, if properly calibrated, transmission 330 may be used to provide information regarding acceleration, deceleration, position, attitude or other relevant information.

In some embodiments, both lead vehicle 201 and follow vehicle 221 may be equipped with a focused beam transmitter, such as a laser transmitter, and an appropriate sensor 308 or 328 for receiving laser transmissions, in lieu of wireless transmitters 202 and 222. These embodiments may be used in situations where it is desirable to limit the ability of others to receive the wireless transmissions used when lead vehicle 201 is leading follow vehicle 221. It will be recognized by one of skill in the art that in such arrangements, it may be necessary or desirable to provide actuation to direct the transmission 330 in the appropriate direction as the relative positions and orientations of vehicles 201 and 221 shift. Moreover, it may be necessary to reduce the follow distance between vehicles 201 and 221 in curving or hilly terrain such that line-of-sight may be maintained between transmitter 329 and sensor 308 or between transmitter 306 and sensor 328.

Figure 4A:
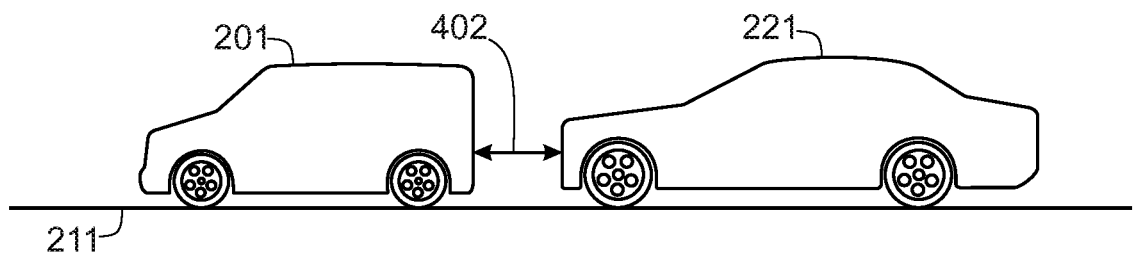
FIG. 4A illustrates a side view of a block diagram of two vehicles according to an embodiment of the present invention.

Referring now to FIG. 4A, when travelling at lower speeds or in appropriate situations, such as long, open straightaways with no hazards, it will be desirable for follow vehicle 221 to follow lead vehicle 201 at a smaller following distances, such as one car length or a few car lengths behind vehicle 201, as illustrated by gap 402. This is possible in such circumstances because braking distances are reduced at low speeds and vehicle maneuvers happen at lower speeds, allowing for appropriate communication and reaction periods by follow vehicle 221 and other vehicles that may be in a convoy behind vehicle 221. Additionally, a closer follow distance reduces the possibility that a vehicle, human or other object will insert itself into the gap 402 between vehicle 201 and vehicle 221. On high speed straightaways, it may be desirable to reduce gap 402 to reduce wind resistance and increase drafting capabilities of a line of vehicles. Or to reduce the chances that other vehicles or objects insert themselves between lead vehicle 201 and follow vehicle 221 or other vehicles in a convoy.

Figure 4B:
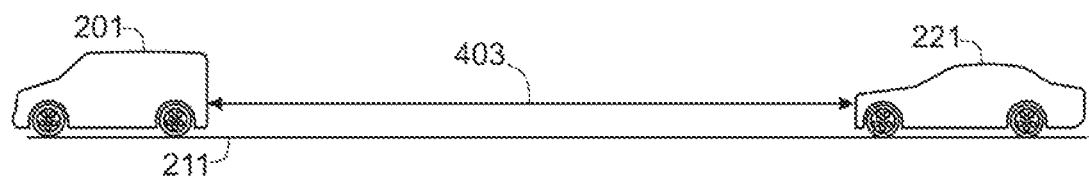
FIG. 4B illustrates a side view of a block diagram of two vehicles according to an embodiment of the present invention.

Referring to FIG. 4B, in many situations, when travel speed increases, it will be desirable to increase the gap between lead vehicle 201 and follow vehicle 221 to a longer distance as indicated by gap 403. Gap 403 may be several car lengths or even tens of car lengths depending on the travel speed. Additionally, increasing distances in this manner may be desirable where a travel path is winding or hilly, or where a hazard avoidance maneuver is performed. For example, if the controller 204 detects that lead vehicle 201 has swerved to avoid an object or hole, it may be desirable to increase travel distances. This may be done, for example, in a long convoy by signaling vehicle 671 to significantly reduce speed, signaling vehicle 661 to reduce speed to a lesser amount, signaling vehicle 651 to reduce speed to an even lesser amount, and so on, such that the gap between each pair of vehicles in the convoy is increased. Such an increase will allow for additional time for the follow vehicles to detect and avoid hazards or to stop until the hazard can be cleared. In some embodiments where the invention is deployed in, for example, warzones, it may be desirable to increase the gap 403 between vehicles on an open road, to reduce the potential impact of an attack on a single vehicle. Similarly, in such areas, it may be desirable to reduce the gap 402 between vehicles in urban areas, to reduce the opportunity for attackers to respond when vehicles pass unexpectedly.

Figure 5:
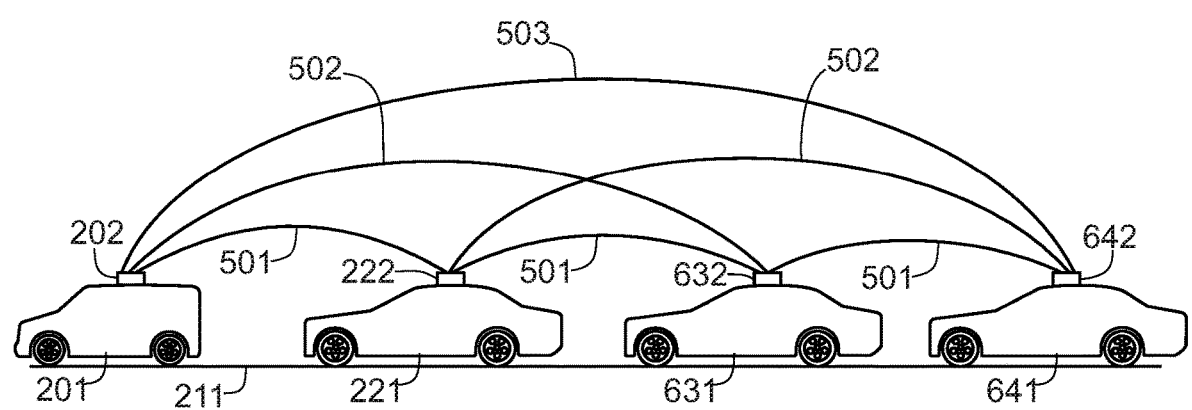
FIG. 5 illustrates a side view of a block diagram of four vehicles according to an embodiment of the present invention.

Referring to FIG. 5, on surface 221, a lead vehicle 201 is depicted in front of a first follow vehicle 221. Follow vehicle 221 is in front of a second follow vehicle 631. Second follow vehicle 631 is in front of a third follow vehicle 641. Though only four vehicles are depicted, it is possible to extend the row of vehicles—sometimes referred to as a train or convoy—to a much larger number of vehicles while remaining within the scope of the invention disclosed herein. Vehicle 201 is illustrated as having a wireless transceiver 202 placed upon its roof. Wireless transceiver 222 is illustrated on the roof of vehicle 221. Wireless transceiver 632 is illustrated on the roof of vehicle 631. And wireless transceiver 642 is illustrated on the roof of vehicles 641. While each of transceivers 202, 222, 632, and 642 are illustrated as being placed on top of the vehicles, it is often more desirable to place the wireless transceivers within the vehicles to prevent theft, damage from the elements, and other undesirable effects of having a transceiver exposed. And in some embodiments, the wireless transceiver may be integral with or enclosed in the same housing as the controller to which it is connected. However, in certain line-of-sight communications systems, it may be more desirable to place the transceivers on top of the vehicles to reduce the number of objects (such as A-, B-, C- and D-pillars) that may interfere with or block line-of-sight transmissions.

A series of arcs 501, 502 and 503 is provided to indicate possible wireless communication connections between the vehicles 201, 221, 631 and 641. Links 501 illustrate wireless connections between two vehicles immediately in sequence in the convoy, such as links 501 between (a) transceiver 202 and transceiver 222, (b) transceiver 222 and transceiver 632, and (c) transceiver 632 and transceiver 642. Links 502 illustrate wireless connections between two vehicles with an interposing vehicle, such as links 502 between (a) transceiver 202 and transceiver 632 and (b) transceiver 222 and transceiver 642. Link 503 illustrates a wireless connection between two vehicles with two interposing vehicles, such as link 503 between transceiver 202 and transceiver 642. In various embodiments of the invention, transceiver 222 in follow vehicle 221 is wirelessly connected to one or more of the other wireless transceivers, including transceiver 202 in vehicle 201.

In various embodiments, various types of wireless connections may be used to distribute data and control information among vehicles in the train. For example, it may be desirable to connect transceiver 202 to each of transceivers 222, 632, and 642 to rapidly convey acceleration, deceleration or hazard information, among other relevant information, to each of the vehicles. However, in such an embodiment, information generated by the controller 224 in vehicle 221 that will be useful to vehicles 631 and 641 could not be conveyed directly. Instead, transceiver 222 would send the information to transceiver 202, which would then send the information to transceivers 632 and 642. In many communication systems and situations, routing the information in this manner may be acceptable. But in certain emergency situations, it may be desirable to have a direct connection. In another embodiment, it may be more desirable to connect transceiver 642 to each of the other transceivers 202, 222, and 632, so that if follow vehicle 641 begins to fall behind the train, each of the other vehicles may more rapidly take appropriate action to maintain the train. In certain embodiments, it may be desirable to wirelessly connect each transceiver to every other transceiver, such that, for example, each of the illustrated arcs 501, 502 and 503 is employed. And in certain embodiments, it may be desirable to connect a transceiver only to adjacent transceivers by using, for example, only arcs 501 to transmit and receive information. In such embodiments, data sent by transceiver 202 must traverse transceivers 222 and 632 before reaching transceiver 642. And responsive data must traverse all of the transceivers on its return path.

Figure 6A:
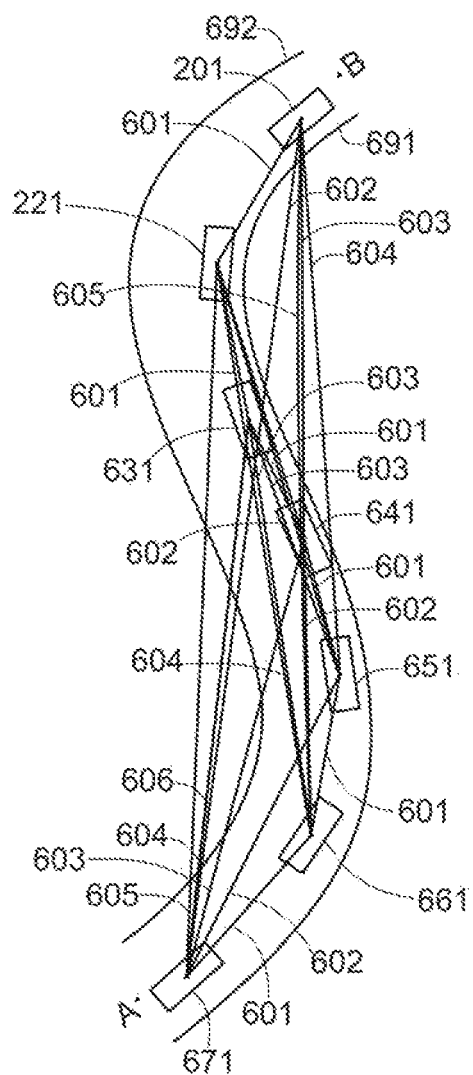
FIG. 6A illustrates a top view of a block diagram of seven vehicles according to an embodiment of the present invention.

FIG. 6A depicts a series of vehicles 201, 221, 631, 641, 651, 661, and 671 indicated in block format, each with a hypothetical horizontal center of mass indicated by a dot at the center of the block. (It is understood that in many vehicles, the center of mass is not actually located at the center of the vehicle while travelling. Thus, the dots are positioned centrally for purposes of illustration only.) In FIG. 6A, it can be assumed that the vehicles are travelling along a path from position A to position B, and that vehicle 201 is the lead vehicle, vehicle 221 is a first follow vehicle, vehicle 631 is a second follow vehicle, and so on through the sixth follow vehicle 671. Each of vehicles 221, 631, 641, 651, 661, and 671 may be wirelessly linked to one or more of the other vehicles, as indicated with respect to FIG. 5. It is preferable, but not required, that all follow vehicles be wirelessly linked to lead vehicle 201, especially if lead vehicle 201 is operated by a human operator. Any or all of vehicles 201, 221, 631, 641, 651, 661, and 671 may be a single vehicle or a vehicle towing a trailer or vehicle (such as a semi-tractor-trailer rig or a tow truck).

Straight line paths between vehicles are indicated connecting pairs of vehicles. Lines 601 indicate a path between one vehicle and the vehicle immediately ahead of or behind that vehicle, for example, the path between vehicle 651 and either vehicle 641 or vehicle 661. Lines 602 indicate a straight line path between a vehicle and the vehicle that is two vehicles ahead of or behind that vehicle, for example, the path between vehicle 641 and either vehicle 221 or vehicle 661. Lines 603 indicate a path between one vehicle and the vehicle that is three vehicles ahead of or behind that vehicle, for example, the path between vehicle 671 and vehicle 641 or the path between vehicle 221 and vehicle 651. Lines 604 indicate a path between a vehicle and the vehicle that is four vehicles ahead of or behind that vehicle, for example the path between vehicle 661 and vehicle 221 or the path between vehicle 631 and vehicle 671. Lines 605 indicate the path between one vehicle and the vehicle that is five vehicles ahead of or behind that vehicle, for example, the path between vehicle 671 and vehicle 221 or the path between vehicle 201 and vehicle 661. And line 606 indicates the path between vehicles that are six vehicles apart from one another, in this illustration only the path between vehicles 201 and 671. It will be recognized that in a system with additional vehicles, additional instances of each type of path will be present, as will longer paths.

One may assume that in FIG. 6A, the desired path of travel for each of the vehicles 201, 221, 631, 641, 651, 661 and 671 begins at point A and proceeds towards or beyond point B. The desired path is bounded by boundary 692 on the left of the vehicles and boundary 691 on the right of the vehicles. In fact, if boundaries 692 and 691 indicate the boundaries of a roadway with traffic permitted in both directions, the desired path may require that the vehicles 201, 221, 631, 641, 651, 661 and 671 all remain on the rightmost half of the roadway while travelling. As can be seen in FIG. 6A, on a desired path that includes curves, many of the straight line paths 602, 603, 604, 605 and 606 would not be satisfactory for travel by a follow vehicle, as those paths would cause one or more follow vehicles to travel outside of one or more of boundaries 691 and 692. For example, if follow vehicle 671 followed path 606 to travel to the position of vehicle 201, vehicle 671 would travel to the left of boundary 692 and then to the right of boundary 691, both unacceptable deviations from the desired path. Similarly, following any of paths 602, 603, 604 and 605 to the indicated position of lead vehicle 201 would cause the follow vehicle to travel to the right of boundary 691. Moreover, in some instances, even following path 601 to move from the position of vehicle 221 to lead vehicle 201 may cause a portion of vehicle 221 to cross the boundary 691 of the desired path.

Thus, the system of the present invention relies on inputs beyond the present position of lead vehicle 201 to guide follow vehicles 221, 631, 641, 651, 661 and 671. For example, each of the follow vehicles may transmit current position information from sources such as GPS sensors, cellular triangulation, triangulation or sensing of other fixed objects, measurements of sensed boundaries, measurements of distance to the car that the vehicle is following or leading, and other position, velocity or acceleration information to provide guidance to follow vehicles. In many instances, it will be sufficient for the follow vehicles 221 et seq to follow the indicated paths 601 and link their movements together as a series of such segments. However, in many instances, such as the instance illustrated with respect to vehicle 221 possibly crossing the boundary 691 if it closely follows path 601, the system will be required to provide the controller in vehicle 221 with additional information to allow vehicle 221 to follow vehicle 201 without crossing a boundary such as 691.

Figure 6B:
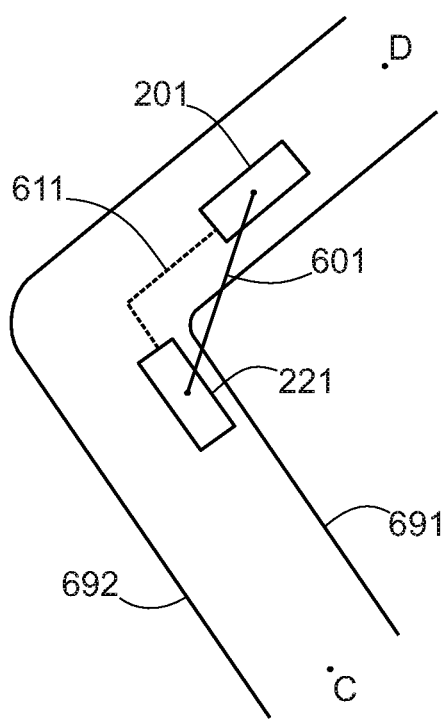
FIG. 6B illustrates a top view of a block diagram of two vehicles according to an embodiment of the present invention.

The boundary-crossing problem is illustrated in FIG. 6B more explicitly. FIG. 6B depicts lead vehicle 201 and follow vehicle 221 in transit from point C to point D along a desired path. The desired path is bounded on the left by boundary 692 and on the right by boundary 691. As can be seen, vehicle 201 has followed a dashed path 611 around a corner with an angle of approximately 90 degrees, as is common in many street intersections. The straight line path 601 from vehicle 221 to vehicle 201 cannot be followed by vehicle 221 without straying outside of the desired path boundary 691. In fact, if the desired path boundary 691 indicates a curb, following path 601 may result in crossing a sidewalk, striking a wall or other structure, striking pedestrians, or other unacceptable results by vehicle 221.

To resolve the problems of boundary-crossing in such instances, it may be necessary to transmit a very granular set of coordinates, guidance instructions, or other data to set vehicle 221 along a path of travel that consistent with path 611 taken by vehicle 201 and that remains within the boundaries 691 and 692 of the desired path.

Figure 6C:
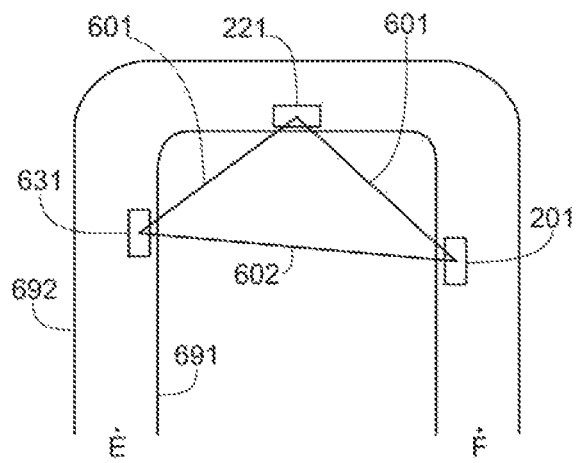
FIG. 6C illustrates a top view of a block diagram of three vehicles according to an embodiment of the present invention.

The boundary-crossing problem is indicated more explicitly in FIG. 6C, where lead vehicle 201 is indicated in the process of travelling from point E to point F while being followed by follow vehicle 221 and second follow vehicle 631. In FIG. 6C, it can be seen that vehicle 201 has passed two sharp turns while remaining within boundaries 691 and 692, and vehicle 221 has passed one of the sharp turns, while vehicle 631 has not yet encountered any sharp turn. If either of vehicles 221 or 631 attempted to follow any of paths 601 or 602 to travel to the position of lead vehicle 201, the vehicles would travel outside of the boundary 691 of the desired path, an undesired and potentially disastrous result. Thus, in certain embodiments of the invention, it may be desirable to relay detailed travel information, including routes, positions, incremental movements, incremental control information, coordinates, or other measurements from vehicle 201 to one or both of vehicles 221 and 631 (and any additional follow vehicles). This information may be further supplemented by information sensed by and relayed from vehicle 221 to either or both of vehicles 201 and 631. In this manner, it may be possible to construct a set of follow instructions that allow a follow vehicle to maintain both an appropriate following distance and an appropriate following path that does not exceed the boundaries of a desired path.

Figure 6D:
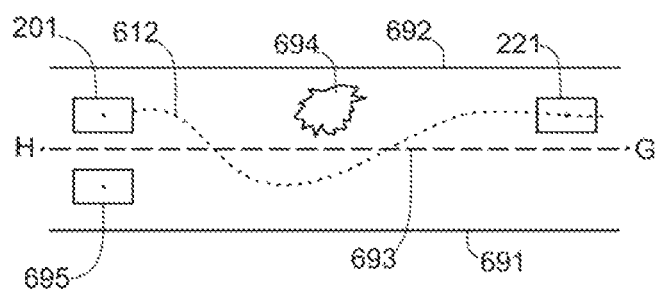
FIG. 6D illustrates a top view of a block diagram of three vehicles according to an embodiment of the present invention.

FIG. 6D illustrates yet another problem that may be encountered in the use of the systems and methods described herein. In this illustration, lead vehicle 201 is illustrates as travelling from point G to point H along a dashed path indicated as 612 within a desired path bounded by boundary 691 on the left and boundary 692 on the right. Also indicated is a dashed center boundary 693, indicating that boundary 693 exists in certain situations, such as when oncoming vehicular traffic is encountered, but may not be a mandatory boundary in other situations, such as when no oncoming vehicular traffic is encountered. As indicated, rather than proceeding straight and between boundaries 692 and 693, the path 612 deviates to the left and into the area between boundaries 693 and 691 before returning to the area between boundaries 692 and 693. The likely reason for the deviation is the location of an obstacle 694 (such as a fallen rock or tree, stopped vehicle, animal, or other obstacle) in the desired path between boundaries 692 and 693. As is also indicated, lead vehicle 201 was able to deviate and return to the area between boundaries 692 and 693 before meeting oncoming vehicle 695. However, depending on the rate of travel of oncoming vehicle 695 and follow vehicle 221, it may not be possible for follow vehicle to follow path 612 to avoid the obstacle while maintaining an appropriate following distance behind vehicle 201. Rather, taking such action may result in a collision between an oncoming vehicle 695 and follow vehicle 221. The problem may be compounded into a multiple vehicle collision if additional follow vehicles are convoyed behind vehicle 221. Thus, in such situations, the methods of the invention may be combined with sequencing solutions for collision avoidance.

Many solutions exist and are known in the art with respect to sequencing to solve the problem illustrated in FIG. 6D. Thus, the invention is not limited to any one solution. However, by way of example, vehicle 221 may be directed by its controller to slow to a lower rate of travel or stop at a safe distance from obstacle 694 until vehicle 695 and any other oncoming vehicles that pose a threat have safely passed vehicle 221. As vehicle 221 is being directed to slow or stop (or independently undertakes such slowing or stopping to avoid a collision), a wireless transmission may be sent to the vehicle 201 to alert the human operator to slow or stop until vehicle 221 can proceed safely, so that a safe following distance and wireless communication may be maintained. In situations where multiple follow vehicles are being convoyed and the potential collision with vehicle 695 is avoided by a later vehicle in the convoy, the message to slow or stop may be relayed to multiple follow vehicles both ahead of and behind the affected vehicle, to maintain appropriate follow distances for all vehicles in the convoy. In some such situations, it may be desirable to allow a convoy to break into two convoys, one in front of the hazard 694 and one behind the hazard 694 to avoid excessive delays to the entire convoy. In such situations, it will be desirable to have a human operator in the follow vehicle that will become a lead vehicle for the second convoy and to alert the human operator of that vehicle that it is desirable for the human operator to take control of the vehicle. If a human operator is not available or able to take control of the vehicle, then it may be necessary to maintain a single convoy by directing the lead vehicle 201 and any follow vehicles between vehicle 201 and obstacle 694 to slow or stop until later vehicles can proceed beyond obstacle 694.

Figure 7:
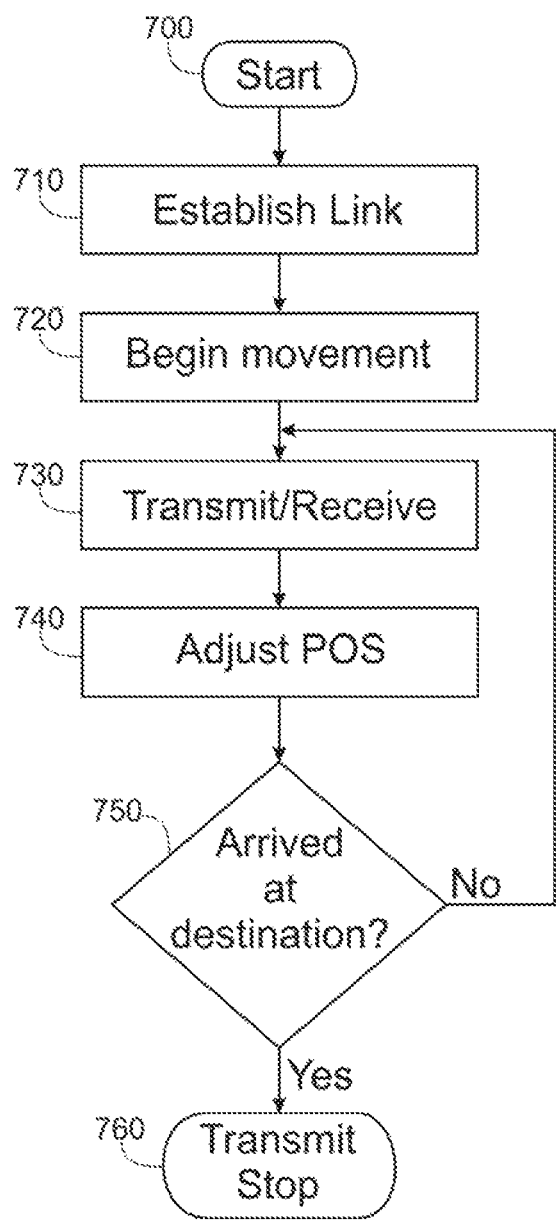
FIG. 7 illustrates a flow chart of steps that may be taken according to an embodiment of the present invention.

Referring now to FIG. 7, a simplified flowchart for a method according to an embodiment of the invention is illustrated. It will be recognized that this flowchart is provided by way of example only and sets forth basic steps that may be used in implementing the invention, but does not set forth every detailed step that may be used in the invention or in solving the problems detailed above with respect to FIGS. 6A-6D. In step 700, the method is started. In step 710, a wireless connection is established between a lead vehicle 201 and a follow vehicle 221. As indicated above, this may be a direct connection or a connection relayed through indirect communication methods. At step 710, if multiple vehicles will be convoying together, it is desirable to establish a wireless communication link, either direct or indirect, between lead vehicle 201 and each of the follow vehicles. In step 720, lead vehicle 201 begins movement, preferably forward, and may deviate from a straight path to the left or right or, if the terrain so dictates, up or down.

In step 730, lead vehicle 201 wirelessly transmits information regarding its movement, position, attitude, and/or sensed surroundings or circumstances to one or more follow vehicles and may wirelessly receive data regarding the same or similar information from one or several follow vehicles. Lead vehicle 201 may also transmit various guidance or sensor-enablement instructions to one or more follow vehicles. In step 740, the position of the follow vehicles, such as follow vehicle 221, is adjusted by the inventive system controlling the follow vehicle. In step 750, the system inquires whether a destination has been reached. This may take, for example, the form of an inquiry into whether the lead vehicle 201 is moving or stopped. Or it may take the form a check of desired destination coordinates in view of current GPS position. It may also take the form of checking whether a certain number of hours or miles of travel have occurred or other forms. If the answer to this question is no, the method returns to step 730 and continues to repeat steps 730, 740 and 750 until the destination is reached or a pre-destination stop command is received. If the answer to the question posed in step 750 is yes, the lead vehicle 201 will preferably wirelessly transmit an indication that the destination has been reached at step 760, which may be transmitted with a command to stop. Upon receiving a command to stop, it is preferred that each of the follow vehicles move into a close-following position behind the vehicle in front of it and stop movement. In some embodiments, the destination of lead vehicle 201 may not be the same as the destination of all of the follow vehicles. Thus, receipt of the stop command may result in the control systems of one or more of the follow vehicles alerting a human operator to take control.

Figure 8:
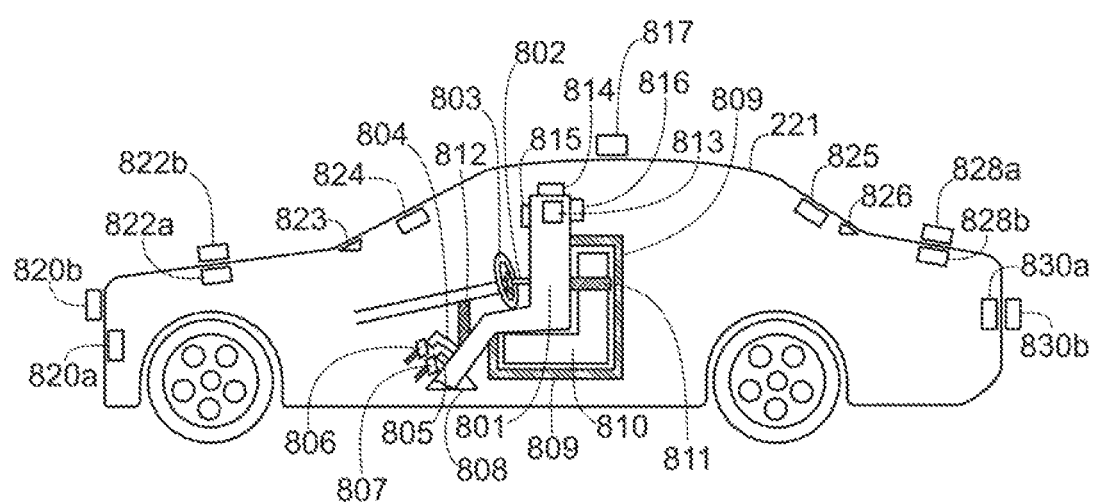
FIG. 8 illustrates a side view of a physical embodiment of a mechanical system according to an embodiment of the present invention.

Referring now to FIG. 8, a side view of a block diagram of a system according to an embodiment of the invention is depicted. Follow vehicle 221 is shown with one embodiment of a control system depicted. Numerous optional sensors are depicted in optional locations.

Control unit 801 is an optional embodiment of a removable controller such as controller 204, configured for placement in a standard vehicle 221 with human-operable controls, such as steering wheel 803, accelerator 807 and brake pedal 806. Other controls may be relevant and may be interfaced with control unit 801 using appropriate mechanical, electrical, wireless, optical, or other interfaces.

In this embodiment, control unit 801 is presented in a housing having a nominally humanoid size and form. Such a housing may be desirable, as it may present a contextual reference that allows an installer of the control unit 801 to easily understand the position and orientation in which the control unit should be placed in the driver's seat of a vehicle equipped for human operation. Optional strap 811 may be provided (indicated with cross-hatching extending from upper-right to lower-left) and can be extended and tightened laterally around the driver's seat 810 to hold unit 801 in place. Similarly, optional strap 809 (indicated with cross-hatching extending from upper-left to lower-right) may be provided and can be extended under the driver's seat 810, up the rear of the seat 810, and over the top of the seat 810, and tightened to hold control unit 801 in place. It may also be optional to latch the seatbelt (not illustrated) for the driver's seat 810 about the unit 801, either in locked or extendable function, to hold the control unit 801 in place.

A portion of the control unit 801 may extend under the steering wheel and towards the floor of the vehicle 221. This portion of the housing may be a single piece, two pieces similar to legs to provide additional stability, or multiple pieces extending downward. At the bottom of this portion, a footing 808 may be configured to lay flat on the floorpan of the vehicle to provide additional stability. It may be desirable to fashion either the footing 808 or the housing in an extendable manner to accommodate different sizes of vehicles and/or different positions of the seat 810. It may also be desirable to provide a brace 812 (illustrated with crossing hatching) extending upward from the housing or footing 808 to the bottom of the dash board or steering column of vehicle 221, to more firmly hold unit 801 in position. The housing, footing 808 and brace 812 are preferably be configured in a form that will not improperly interfere with vehicle controls.

If a mechanical interface for accelerator 807 and brake pedal 806 are required, the momentum control system portion of control unit 801 may be provided with mechanical interface 805 to operate accelerator 807 and mechanical interface 804 to operate brake pedal 806. Similarly, the momentum control system portion of control unit 801 may be provided with mechanical interface 802 to operate steering wheel 803. Interfaces 804, 805 and 806 are illustrated in block format only, in a manner that is intended to illustrated interface, but not the actual form or size of the interfaces. One of ordinary skill in the art will recognize that the arts of controls for disabled persons and self-driving vehicles contain many types of mechanical interfaces that may be employed in the instant invention and integrated with appropriate actuators to mechanically control the human-operable vehicle controls.

If a mechanical interface for the controls is not required, control unit 801 may be provided with appropriate electrical, wireless, optical, or other interfaces to provide control data directly to one or more computers within vehicle 221 to control the steering, acceleration, deceleration and other desired controls of the vehicle 221. At present, many vehicles may be electronically controlled in such fashion. And the capability to do so is being integrated into more and more vehicles as time passes.

As illustrated in FIG. 8, control unit 801 may be provided with various integrated sensors 813, 814, 815, and 816. Sensor 815 is a front-facing sensor that may be used to monitor the forward portion of the vehicle 221, the lead vehicle 201, and/or the roadway in front of the vehicle 221. Rear facing sensor 816 may be used to monitor the rear portion of the vehicle 221, a second follow vehicle behind vehicle 221, and/or the roadway behind the vehicle 221. Side facing sensor 813 may be used to monitor one or both sides of vehicle 221 and objects detected along the side of the vehicle 221. Top-mounted sensor 814 may be employed to monitor the front, rear, and/or sides of the vehicle, provided that it has appropriate unobstructed fields in those directions. Thus, sensor 814 may be used in place of all of sensors 813, 815 and 816. Directly mounting one or more sensors on control unit 801 provides a potential benefit of having fewer loose parts or parts that must be mounted or attached in other positions in the vehicle 221. If all parts can be integrated into a single unit, such as 801, it is believed that such integration provides less opportunity for human error in installing the control system.

Multiple potential locations for sensors or transceivers are illustrated in FIG. 8. Sensors may be mounted at the front of the vehicle 221, either inside the vehicle as sensor 820a or outside the vehicle as sensor 820b. Sensors may be mounted below the hood as sensor 822a or above the hood as sensor 822b. A sensor may be placed on the dashboard as sensor 823 or attached to the windshield or rearview mirror as sensor 824. A sensor may be mounted on the roof as sensor 817. It is possible to mount a sensor hanging from the roof, but it is believed that in most vehicles such a mount will require some modification or installation of mounting hardware. Thus, it is possible, but not preferred to hang a sensor for this invention from the roof of the vehicle. A sensor may be attached to the rear window as sensor 825 or placed on the rear shelf of a vehicle as sensor 826. A sensor may be mounted on top of the trunk as sensor 828a or within the trunk as sensor 828b. A sensor may also be mounted inside the rear of the vehicle as sensor 830a or on the exterior of the rear of the vehicle as sensor 830b. The foregoing list is intended to illustrate that various sensors may be mounted in various locations on a vehicle. But the list is not intended to be exclusive of non-illustrated mounting positions. For example, sensors may be mounted on the sides of a vehicle, including the mirrors and windows, etc. Sensors may also be mounted beneath a vehicle. Various sensor mounting positions are provided to provide flexibility in operation and the ability to select an appropriate mounting position for various types of sensors. For example, a sensor of a type of RF radiation for which glass is transparent may be advantageously mounted inside the windshield at location 824 to protect the sensor from the elements. However, a forward sensor of a type of RF radiation for which glass is opaque may be more advantageously mounted in location 820a or 820b so that the windshield will not obscure the relevant RF radiation.

Wireless transceiver 222 (not illustrated in FIG. 8) may be integrated into control unit 801 or mounted in one or more of the sensor locations illustrated in FIG. 8. As with integration of the sensors, integration of the transceiver 222 into control unit 801 provides for fewer loose parts. It is believed that such integration will eliminate some amount of human error in the installation of control unit 801 in a vehicle 221.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

The controller and transceiver embodiments described above can be embodied within additional hardware, such as a single integrated circuit (IC) chip, multiple ICs, an application specific integrated circuit (ASIC), or the like. Further, the order in which some or all of the process steps appear in each process should not be deemed limiting. Rather, it should be understood that some of the process steps can be executed in a variety of orders that are not all of which may be explicitly illustrated herein.

What has been described above includes examples of the implementations of the present invention. It is, of course, not possible to describe every conceivable combination of components or methods for purposes of describing the claimed subject matter, but many further combinations and permutations of the subject embodiments are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the various embodiments includes a system as well as a computer-readable storage medium having computer-executable instructions for performing the acts and/or events of the various methods of the claimed subject matter.

What is claimed is:

1. A method, comprising,
receiving, by a system operatively coupled to a processor, guidance information regarding current driving operations being performed by a lead vehicle
determining, by the system, control instructions for a follow vehicle that cause the follow vehicle to maintain a following position relative to the lead vehicle, wherein the determining comprises determining the control instructions based on the guidance information and one or more operational parameters indicating a difference in capabilities of performance of at least one driving operation by the lead vehicle and the follow vehicle;
directing, by the system, the follow vehicle to apply the control instructions to control current driving operations of the follow vehicle;
monitoring, by the system, signals transmitted by the lead vehicle to the follow vehicle; and
determining, by the system, whether an intervening vehicle is located between the lead vehicle and the follow vehicle based on a pattern associated with reception of the signals by a receiving unit of the follow vehicle.

2. The method of claim 1, further comprising,
sensing, by the system using one or more sensors attached to or within the follow vehicle, a position and speed of the lead vehicle relative to the follow vehicle; and
directing, by the system, the follow vehicle to adjust one or more mechanical inputs to steering and speed controls of the follow vehicle based on the position and speed of the lead vehicle to cause the follow vehicle to maintain the following position relative to the lead vehicle.

3. The method of claim 1, wherein, the lead vehicle comprises standard human operable steering and speed controls including at least a steering wheel, accelerator pedal, and brake pedal, and wherein the guidance information comprises information related to human inputs to one or more of the human operable controls of the lead vehicle.

4. The method of claim 1, wherein the system is integrated on or within the follow vehicle.

5. The method of claim 1 wherein the guidance information comprises sensory feedback captured via one or more sensors of the lead vehicle, the sensory feedback including at least one of: a speed of the lead vehicle, an acceleration of the lead vehicle, a deceleration of the lead vehicle, a forward-motion of the lead vehicle, steering of the lead vehicle, or a lateral movement of the lead vehicle.

6. The method of claim 1, wherein based on determination that the intervening vehicle is located between the lead vehicle and the follow vehicle, the method further comprises:
sending, by the system, a notification to the lead vehicle notifying the lead vehicle regarding the intervening vehicle.

7. A method, comprising,
receiving, by a system operatively coupled to a processor, guidance information regarding current driving operations being performed by a lead vehicle
determining, by the system, control instructions for a follow vehicle that cause the follow vehicle to maintain a following position relative to the lead vehicle, wherein the determining comprises determining the control instructions based on the guidance information and one or more operational parameters indicating a difference in capabilities of performance of at least one driving operation by the lead vehicle and the follow vehicle;
directing, by the system, the follow vehicle to apply the control instructions to control current driving operations of the follow vehicle;
wherein the determining the control instructions comprises determining maximum and minimum travel parameters for the lead vehicle and the follow vehicle based on one or more differences in capabilities of performance of one or more driving operations by the lead vehicle and the follow vehicle; and wherein the maximum and minimum travel parameters are selected from the group consisting of: maximum and minimum acceleration rates, maximum and minimum deceleration rates, maximum and minimum speeds, maximum and minimum turn radii, and maximum and minimum cornering profiles.

8. The method of claim 7, further comprising, sensing, by the system using one or more sensors attached to or within the follow vehicle, a position and speed of the lead vehicle relative to the follow vehicle; and directing, by the system, the follow vehicle to adjust one or more mechanical inputs to steering and speed controls of the follow vehicle based on the position and speed of the lead vehicle to cause the follow vehicle to maintain the following position relative to the lead vehicle.

9. The method of claim 7, wherein, the lead vehicle comprises standard human operable steering and speed controls including at least a steering wheel, accelerator pedal, and brake pedal, and wherein the guidance information comprises information related to human inputs to one or more of the human operable controls of the lead vehicle.

10. The method of claim 7, wherein the system is integrated on or within the follow vehicle.

11. The method of claim 7, wherein the guidance information comprises sensory feedback captured via one or more sensors of the lead vehicle, the sensory feedback including at least one of: a speed of the lead vehicle, an acceleration of the lead vehicle, a deceleration of the lead vehicle, a forward-motion of the lead vehicle, steering of the lead vehicle, or a lateral movement of the lead vehicle.

12. A system comprising:

a processor, and a memory provided that stores executable instructions that, when executed by the processor, facilitate performance of operations, comprising:

receiving guidance information regarding current driving operations being performed by a lead vehicle;

determining control instructions for a follow vehicle that cause the follow vehicle to maintain a following position relative to the lead vehicle, wherein the determining comprises determining the control instructions based on the guidance information and one or more operational parameters indicating a difference in capabilities of performance of at least one driving operation by the lead vehicle and the follow vehicle; and controlling driving operations of the follow vehicle based on the control instructions;

wherein the determining control instructions comprises determining maximum and minimum travel parameters for the lead vehicle and the follow vehicle based on one or more differences in capabilities of performance of one or more driving operations by the lead vehicle and the follow vehicle; and wherein the maximum and minimum travel parameters are selected from the group consisting of: maximum and minimum acceleration rates, maximum and minimum deceleration rates, maximum and minimum speeds, maximum and minimum turn radii, and maximum and minimum cornering profiles.

13. The system of claim 12, wherein the controlling comprises controlling one or more mechanical inputs to steering and speed controls of the follow vehicle based on the control instructions.

14. The system of claim 12, wherein the operations further comprise:

sensing, using or more sensors attached to or within the follow vehicle, a position and speed of the lead vehicle relative to the follow vehicle, and wherein the determining further comprises determining the control instructions based on the position and speed of the lead vehicle.

15. The system of claim 12, wherein the system is integrated on or within the follow vehicle.

16. The system of claim 12, wherein the guidance information comprises sensory feedback captured via one or more sensors of the lead vehicle, the sensory feedback including at least one of: a speed of the lead vehicle, an acceleration of the lead vehicle, a deceleration of the lead vehicle, a forward-motion of the lead vehicle, steering of the lead vehicle, or a lateral movement of the lead vehicle.

* * * * *